United States Patent [19]

Narayan et al.

[11] Patent Number: 5,969,089
[45] Date of Patent: Oct. 19, 1999

[54] BULK REACTIVE EXTRUSION POLYMERIZATION PROCESS PRODUCING ALIPHATIC ESTER POLYMER COMPOSITIONS

[75] Inventors: Ramani Narayan; Mohan Krishnan, both of Okemos; Joseph B. Snook; Ajay Gupta, both of East Lansing, all of Mich.; Philippe DuBois, Ciplet, Belgium

[73] Assignee: Board of Trustees operating Michigan State University, East Lansing, Mich.

[21] Appl. No.: 08/925,529

[22] Filed: Sep. 8, 1997

Related U.S. Application Data

[62] Division of application No. 08/639,198, Apr. 26, 1996, Pat. No. 5,801,224.

[51] Int. Cl.⁶ .................................................. C08G 63/08
[52] U.S. Cl. ........................ 528/357; 528/358; 528/359
[58] Field of Search ...................................... 528/357, 358

[56] References Cited

U.S. PATENT DOCUMENTS

| | | | |
|---|---|---|---|
| 5,286,770 | 2/1994 | Bastioli et al. | 524/52 |
| 5,310,599 | 5/1994 | Ford | 528/354 |
| 5,412,005 | 5/1995 | Bastioli et al. | 524/47 |
| 5,468,837 | 11/1995 | Wautier | 528/357 |
| 5,500,465 | 3/1996 | Krishnan et al. | 524/47 |
| 5,656,718 | 8/1997 | Wautier et al. | 528/357 |

FOREIGN PATENT DOCUMENTS 626405  11/1994  European Pat. Off. .

OTHER PUBLICATIONS

Bagley, et al., Polymer Engineering and Science, 17 (5) p. 311 (1977).

Pledger, et al., J. Macromol. Sci.–Chem A22 (4) p. 415 (1986).

Tahan and Zilkha, Journal of Polymer Science: A–1, 7, p. 1815 (1969).

Chinnaswamy and Hanna (Starch/Starke, 43 (10) p. 396 (1991).

Introduction to Polymers, 2nd Ed. 11–14 (1991).

Kye, H., et al., J. Applied Polymer Science 52:1249–1262 (1994).

Michaeli, W., et al., J. Applied Polymer Science, 48:871–886 (1993).

*Primary Examiner*—Tae Yoon
*Attorney, Agent, or Firm*—Ian C. McLeod

[57] ABSTRACT

A bulk extrusion polymerization process to derive an aliphatic polyester from a suitable ester monomer, preferably ε-caprolactone. Novel reaction formulations containing less than 100 ppm water and having an acid value less than 0.5 mg KOH/g and preferably less than 0.2 mg KOH/g enable the polymerization of bulk monomer in an extruder in a resident time of less than 2 minutes. Different catalyst and initiator systems, processing protocols, and screw configurations lead to the preferred manufacture of poly(ε-caprolactone) polymer of number average molecular weight, $M_n$, greater than 100,000. A novel poly(ε-caprolactone) intermediate optionally grafted to starch, is described which has significantly different processing and use characteristics as compared to a straight-chain polycaprolactone.

6 Claims, 6 Drawing Sheets

BULK REACTIVE EXTRUSION POLYMERIZATION PROCESS PRODUCING ALIPHATIC ESTER POLYMER COMPOSITIONS

This is a divisional of application Ser. No. 08/639,198 filed on Apr. 26, 1996, now U.S. Pat. No. 5,801,224.

GOVERNMENTS RIGHTS

This invention was developed under Contract No. 94341890067 Cooperative State Research Service, U.S. Department of Agriculture. The U.S. government has certain rights in this invention.

BACKGROUND OF THE INVENTION

(1) Field of the Invention

The present invention relates to a reactive extrusion process for the bulk polymerization of a cyclic aliphatic ester monomer, using an organometallic polymerization agent (catalyst or initiator), particularly a coordination insertion catalyst, to form a high molecular weight polymer with good control over monomer conversion and molecular weight for use as biodegradable articles. Further, the present invention relates to a reactive extrusion process for the bulk polymerization of a lactone, specifically ε-caprolactone, using coordination insertion catalysts to form a high molecular weight polymer. The polymerization process can optionally be conducted in the presence of other components that bear functionalities like hydroxyl and amino groups including polysaccharides like starches and cellulosics and other types of polymers, which further can be grafted to the polymerized ester.

More specifically, the present invention relates to a continuous extrusion polymerization process to produce high molecular weight poly(ε-caprolactone) compositions at high throughputs. The present invention also relates to compositions derived by the reactive extrusion polymerization process, which are useful in making biodegradable articles and specifically relates to a unique polymer intermediate that exhibits branching. The present invention also relates to compositions derived from admixtures and blends of the polymer intermediate with other components, especially starch.

(2) Description of Related Art

The solution polymerization of ε-caprolactone has been the subject of a number of patents over the last few decades. Growing environmental concerns and unfavorable economics related to the use of organic solvents, make bulk polymerization (without the use of solvents) an attractive alternative for polymer synthesis. Further, bulk polymerization can be conducted in extruders, making it a continuous process. Polystyrenes and nylons have been produced commercially by polymerization in an extruder. A number of patents have evolved regarding polymerization based on variations in extruder screw configurations and polymerization mechanisms. Since different polymerization mechanisms are involved in the extrusion of these polymers, the process schematics and screw configurations vary considerably. The extruder screw configuration can have an effect on yield, molecular weight, molecular weight distribution and product throughput.

Reactive extrusion is an attractive route for polymer processing in order to carry out various reactions including polymerization, grafting, branching and functionalization. Reactive extrusion polymerization involves polymerizing a liquid/solid monomer or pre-polymer within the residence time available in the extruder to form a high molecular weight melt.

The prior art has shown that extruders can be used for bulk polymerizations of monomers like methylmethacrylate, styrene, lactam, and lactide (Michaeli, W., et al., J. of Appl. Polymer Sci. 48:871–886 (1993); Kye, H., et al., J. of Appl. Polymer Sci. 52:1249–1262 (1994); and U.S. Pat. No. 5,412,005). The economics of using the extruder as a bulk polymerization reactor are favorable when high throughputs and control of molecular weight are realized. This places a limitation on the residence time required to complete the polymerization, which ideally should be less than 5 minutes.

Bulk polymerization of ε-caprolactone using coordination insertion catalysts has been discussed by Young et al, ACS Symposium Ser., 59, pages 152–164 (1977). Bulk polymerization of ε-caprolactone in an extruder in the presence of starch to give a compatibilized blend of polycaprolactone, starch and grafted starch-g-polycaprolactone is described in Narayan et al., U.S. patent application Ser. No. 08/400,979, which is incorporated by reference. EP 626405 describes the preparation of low molecular weight polycaprolactone polymer of number average molecular weight, $M_n$, ranging from 35,000 to 66,000 at residence times ranging from 6 to 15 minutes respectively. It is believed that higher molecular weight will improve film processing and enhance properties. Furthermore, a residence time of 15 minutes makes the process economically unattractive.

Starch graft copolymers produced from various monomers, including styrene, methyl methacrylate, methyl acrylate, and butyl acrylate, containing about 50% starch by weight have been prepared by a solution process in which the starch grafting was initiated by radiation in the case of styrene and by cerium ion in the case of other monomers (Bagley, Fanta et. al., Polymer Engineering and Science, 17 (5), p. 311 (1977)). These compositions were extruded directly without addition of plasticizer of homopolymer to give useful products. However, the reaction times for polymerizations were on the order of hours. Starch-acrylamide copolymers were prepared by $Ce^{4+}$ initiated grafting reactions in solution (Pledger, Young et. al., J. Macromol. Sci.-Chem. A22(4), p. 415 (1986)). Anionic polymerization of ethylene oxide on starch has also been reported (Tahan and Zilkha, Journal of Polymer Science: A-1, 7, p. 1815 (1969)). Reactive extrusion of starch graft copolymers using starch macroradicals generated by shear inside an extruder in the presence of vinylic monomers and/or polymers was studied by Chinnaswamy and Hanna (Starch/Starke, 43 (10), p. 396 (1991)).

Low-cost production and processing methods for biodegradable plastics are of great importance since they enhance the commercial viability and cost-competitiveness of these materials. Reactive extrusion is an attractive route for the polymerization of a cyclic ester monomer, without solvents, to produce high molecular weight biodegradable plastics. There is thus a need for an improved bulk polymerization process for economically producing aliphatic ester polymers. Compositions of such polymers that possess improved properties and processability for use as biodegradable articles, especially films, are also of greater relevance.

OBJECTS

It is therefore an object of the present invention to provide a process for the bulk polymerization of a cyclic ester monomer, particularly a lactone monomer, using coordination insertion catalysts to form a high molecular weight polymer, with a number average molecular weight, $M_n$, greater than 100,000. Specifically, it is an object of the invention to provide an extrusion process for the polymerization of ε-caprolactone monomer via a coordination insertion mechanism using catalysts and initiators such as aluminum alkoxides. It is another object of the invention to provide a process wherein the polymerization of a lactone monomer using coordination insertion catalysts is conducted in the presence of other optional components that bear functionalities like hydroxyl and amino groups. Specifically, these components include polysaccharides like starches and cellulosics and other types of polymers. Further, it is an object of the invention to provide a process wherein these secondary components, specifically starches, may be grafted to the polymerized ε-caprolactone. The present invention also relates to compositions derived by the reactive extrusion polymerization process, which are useful in making biodegradable articles and specifically relates to a unique polymer intermediate, specifically a polylactone intermediate that exhibits chain branching. The present invention also relates to compositions derived from admixtures and blends of the polylactone intermediate with other components, especially starch, that are useful in making polymer resin, specifically biodegradable articles, and more specifically biodegradable films. These will become increasingly apparent by reference to the following description and the drawing.

IN THE DRAWINGS

FIG. 1 is a schematic drawing showing an apparatus for the reactive extrusion process including an extruder 13.

FIGS. 2 and 3 are perspective views of a screw element 20 and kneading block 22, respectively.

DESCRIPTION OF PREFERRED EMBODIMENTS

Figure 1:
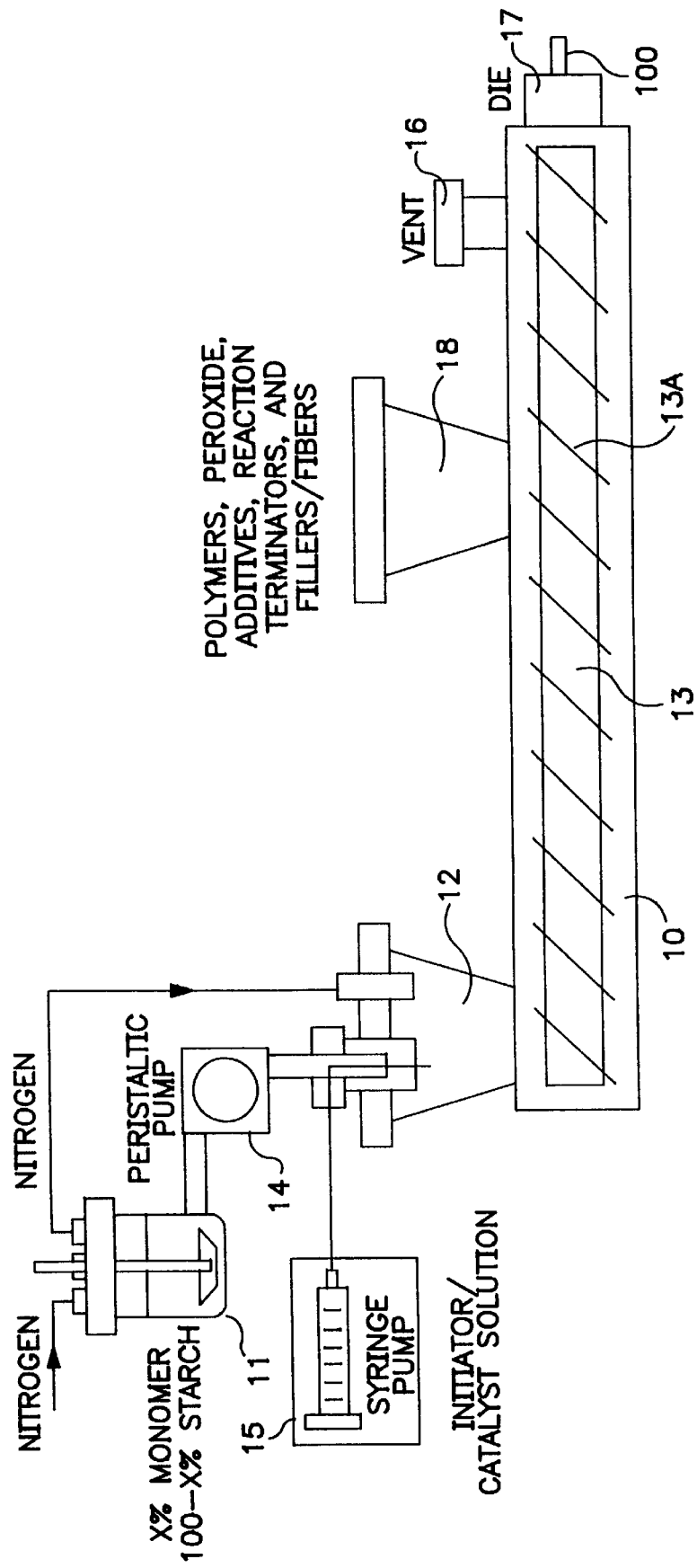

The present invention relates to a process for forming an aliphatic polyester polymer of number average molecular weight, $M_n$, greater than 100,000 which comprises: (i) introducing a reactant mixture comprising an aliphatic ester component containing less than 100 ppm water and having an acid value less than 0.5 mg KOH/g and preferably less than 0.2 mg KOH/g, wherein the aliphatic ester component is preferably a cyclic aliphatic ester monomer containing 4 to 24 carbon atoms, and an organometallic polymerization agent into an extruder, in the absence of a solvent for the ester monomer; and (ii) extruding the reactant mixture at a temperature between about 80 and 240° C. to form the aliphatic polyester polymer intermediate.

The present invention relates to a process for forming an aliphatic polyester polymer which comprises: (i) introducing a reactant mixture comprising an aliphatic ester component, containing less than 100 ppm water and which is preferably an aliphatic ester monomer containing 4 to 24 carbon atoms, a secondary component containing hydroxyl or amino group functionality like polysaccharides and an organometallic polymerization agent into an extruder, in the absence of a solvent for the ester monomer; and (ii) extruding the reactant mixture at a temperature between about 80 and 240° C. to form the aliphatic polyester polymer intermediate.

The present invention further relates to a process for forming an aliphatic polyester polymer of number average molecular weight, $M_n$, greater than 100,000 which comprises: (i) introducing a reactant mixture comprising an aliphatic ester component containing less than 100 ppm water and having an acid value less than 0.5 mg KOH/g and preferably less than 0.2 mg KOH/g, wherein the aliphatic ester component is preferably a cyclic aliphatic ester monomer containing 4 to 24 carbon atoms, and an organometallic polymerization agent into an extruder, in the absence of a solvent for the ester monomer; ii) extruding the reactant mixture at a temperature between about 80 and 240° C. to form an aliphatic polyester polymer intermediate; and (iii) admixing additional ingredients selected from the group consisting of other polymers, fillers, and plasticizers with the aliphatic polyester intermediate. The extrusion mixing can be accomplished downstream.

The present invention also relates to an anhydrous aliphatic polyester polymer intermediate which comprises a polymerization reaction product of an ester selected from the group consisting of cyclic aliphatic ester and an aliphatic ester component containing 4 to 24 carbon atoms and an organometallic polymerization agent.

Further, the present invention relates to an anhydrous polymer intermediate having the structural formula:

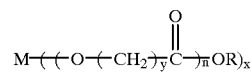

wherein M is a metal species selected from the group consisting of tin, titanium, lithium, zinc, aluminum, zirconium, and samarium and mixtures thereof; y is between 3 and 23, x is an integer between 1 and 4 representing the number of arms attached to M; n is a number related to the degree of polymerization, which is between about zero and 2000 and which may be different for each arm, x; and R is selected from the group consisting of hydrogen, alkyls, and substituted alkyls containing 1 to 6 carbon atoms.

The grafting of poly(ε-caprolactone) to starch using organo-metallic polymerization catalysts is the subject of our U.S. application Ser. No. 08/400,979, filed Mar. 8, 1995. This invention utilizes some of this prior technology.

Specifically, the present invention relates to a process to synthesize high molecular weight lactone polymers by ring-opening polymerization of suitable monomer, oligomer or aliphatic esters containing from 4 to 24 carbon atoms using an organometallic polymerization agent, wherein the polymerization is conducted in the absence of solvents for the monomer, and an extruder or similar equipment is used for the polymerization and wherein the polymerization agents function by coordination insertion mechanism. Specifically, the present invention relates to a reactive extrusion process to synthesize high molecular weight poly(ε-caprolactone) using catalysts and initiators like aluminum alkoxides that have been used as is or derived in situ from alkyl aluminum, wherein the number average molecular weight, $M_n$ values are greater than 100,000.

Figure 7:
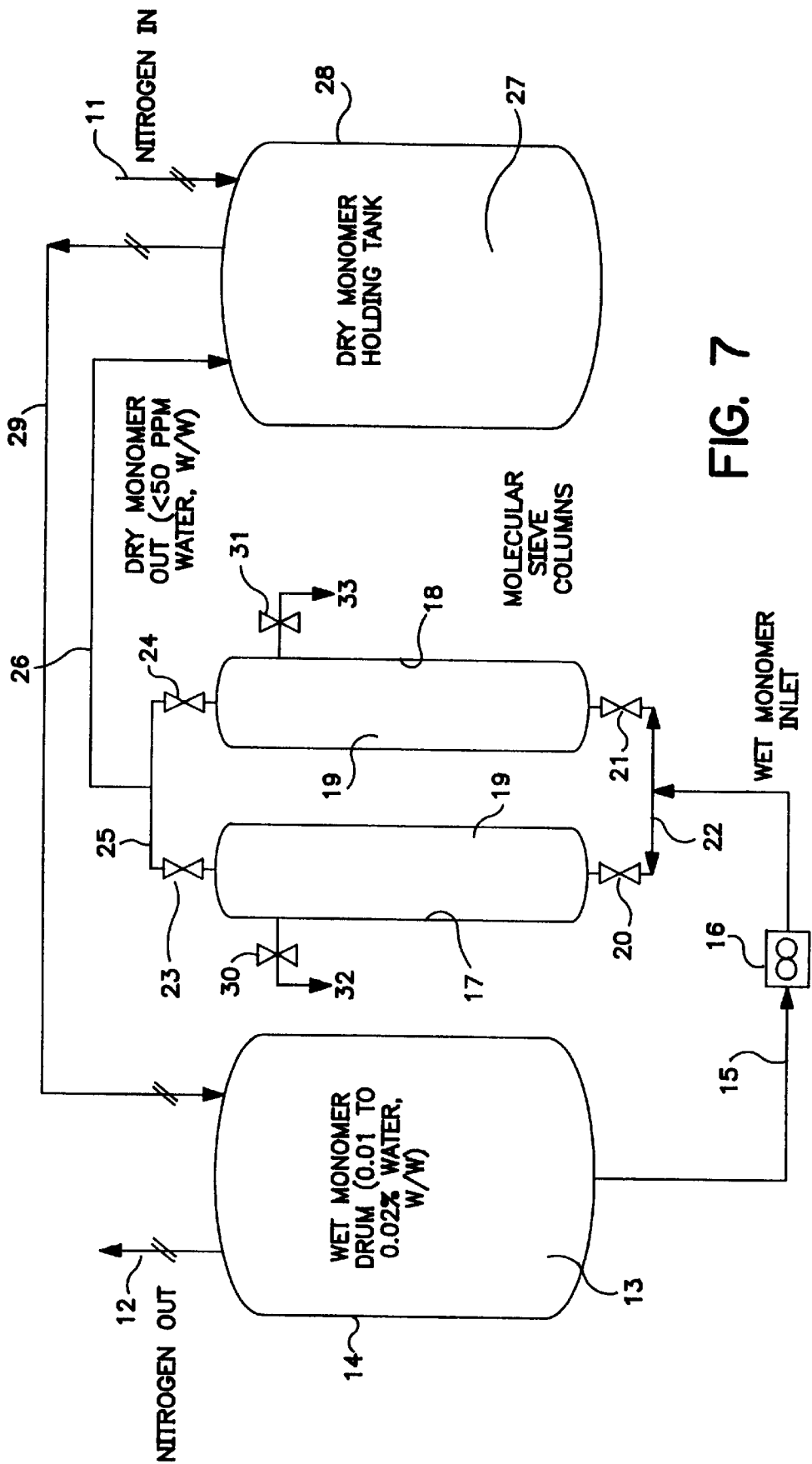
FIG. 7 is a schematic front view of a system 10 for removing water from the monomer.

Trace amounts of water and free acid in the monomer were unexpectedly found to affect the kinetics of the reactive extrusion polymerization. It is hence important to this invention that the aliphatic ester component of the reactant mixture contain less than 100 ppm water by weight. It is a preferred embodiment of the invention that the aliphatic ester component of the reactant mixture also have an acid value less than 0.5 mg KOH/g and preferably less than 0.2 mg KOH/g. The monomer was dried using molecular sieves by a setup shown in FIG. 7. FIG. 7 shows a system 10 for drying of a monomer. A nitrogen blanket is provided to the system through $N_2$ inlet 11 and removed through $N_2$ outlet 12. Wet monomer 13 is held in a first tank 14 and supplied through line 15 and peristaltic pump 16 to parallel columns 17 and 18 filled with a molecular sieve 19. Inlet valves 20 and 21 are provided to columns 17 and 18 in a T-pipe 22, respectively. Outlet valves 23 and 24 are provided in T-pipe 25 leading to line 26. The dried monomer 27 is held in a second tank 28. A recycle line 29 is provided to prevent overflow in the same tank 28. In operation columns 17 or 18 are operated alternately to remove water from the monomer 13. The sieve 19 is regenerated by heating the columns 17 or 18 and opening valves 30 or 31 in lines 32 or 33 to inert gas flow with valves 20 and 23 or 21 and 24 closed. The preferred molecular sieve is Type 3A or 4A, manufactured by Grace Davison, Baltimore, Md.

Further, the present invention relates to a process to synthesize lactone polymers by ring-opening polymerization of suitable monomer containing from 4 to 24 carbon atoms using an organometallic polymerization agent in the presence of optional secondary components bearing hydroxyl or amino groups, wherein the polymerization is conducted in the absence of solvents for the monomer and an extruder or similar equipment is used for the polymerization and wherein the polymerization agents function by coordination insertion. Specifically, the present invention relates to a reactive extrusion process to synthesize poly($\epsilon$-caprolactone) using catalysts and initiators like aluminum alkoxide (used as is or derived in situ from alkyl aluminum) in the presence of secondary components like saccharides and polysaccharides, and other polymers bearing hydroxyl or amino groups. Additionally, these secondary components may be grafted to the lactone polymer and these graft polymers may be generated in situ or separately synthesized.

Finally, the present invention relates to biodegradable compositions based on polylactones derived by said coordination insertion polymerization process, optionally blended or grafted with secondary components that are useful in making polymer resin, specifically biodegradable articles, and more specifically biodegradable films. These biodegradable compositions derived from the aforementioned novel processes may be used as is or be subsequently admixed with other components like fillers, additives and other polymers. Specifically, the present invention relates to biodegradable compositions based on poly($\epsilon$-caprolactone) as derived by aforementioned polymerization process. Specifically, the present invention also relates to a unique polycaprolactone branch polymer composition, derived by aforementioned polymerization process. Specifically, the present invention also relates to admixtures of poly($\epsilon$-caprolactone) as derived by aforementioned polymerization process with other components like fillers, plasticizers, additives and other polymers, wherein these are preferably selected from the group consisting of starch, modified or not, starch-polycaprolactone graft polymer, copolymer of maleic anhydride and polycaprolactone, ethylene-vinyl acetate copolymer, poly(vinyl alcohol), ethylene-vinyl alcohol copolymer, polylactide, organic peroxide, and a mixture of peroxide and maleic anhydride.

The present invention relates to a process to synthesize high molecular weight lactone polymers by ring-opening polymerization of suitable monomer containing from 4 to 24 carbon atoms, in the absence of solvents, using an organometallic polymerization agent. The polymerization of $\epsilon$-caprolactone in bulk (in the absence of solvents) and the ability to graft starch to the polymer chains was the subject of an earlier patent application (Narayan et al., U.S. patent application Ser. No. 08/400,979). The kinetics of polymerization were favorable for developing a novel extrusion process to make high molecular weight polymer suitable for use as biodegradable articles like pellets, films, and the like.

There are significant kinetic, heat transfer and diffusion related issues in a bulk polymerization process that make it difficult to develop and design process methods that result in high molecular weight polymer at high throughputs with good conversion of monomer. Extruders are ideal process vehicles for this purpose as they can be tailored to give various flow patterns, residence-time distributions and shear effects, each of which affect the polymerization and polymer quality. Bulk polymerization of $\epsilon$-caprolactone, optionally in the presence of secondary components, was conducted in an extruder by employing suitable process conditions that make up the scope of this invention.

The various synthetic pathways for poly($\epsilon$-caprolactone) synthesis and copolymerization with starch or other components was outlined in the earlier application (Narayan et al., U.S. Ser. No. 08/400,979). They are as follows:
(I) Lewis acid catalyst (as with stannous octoate).
(II) Metal alkoxide (as with aluminum isopropoxide)
   (a) homopolymerization
   (b) exchange reactions between starch hydroxyls and Al(OiPr)$_3$
   (c) ring-opening polymerization leading to polycaprolactone-grafted starch
(III) In situ generated metal alkoxide (as with triethyl aluminum)
   (a) initiator preparation by in situ generation of alkoxide via coupling reaction with starch
   (b) ring-opening polymerization leading to polycaprolactone-grafted starch Of these, the preferred pathways amenable to reactive extrusion polymerization are II and III using metal alkoxides used as is, or generated "in situ" by reaction of metal alkyls with secondary component hydroxyls.

The components of the reaction mixture that are employed in the process that is within the scope of this invention to derive compositions that are within the scope of this invention include the following:
(I) substrates bearing hydroxyl and/or amino groups that can graft to the derived aliphatic polyester, specifically polysaccharides composed of linear and branched polymers of alpha-D-glucopyranosyl units, dried to a moisture content of less than 2% by weight and wherein this component, especially polysaccharide may be in a form that is granular, plasticized, destructurized, solvated or physically or chemically modified in any other way, or as a mixture of these, preferably in the range of 1 to 95% by weight based on the total amount of polysaccharide and monomer in the reactant mixture, and
(II) one or more polymerizable cyclic ester monomers preferably containing less than 50 ppm water containing 4 to 24 carbon atoms, such as lactones, lactides, and glycolide, substituted or not, and mixtures of the same that polymerize to form high molecular weight polymers, preferably in the range of 5 to 100% by weight based on the total amount of I and II in the reactant mixture, and
(III) the polymerizing agent (catalyst and/or initiator), such as Lewis acid catalyst, metal alkyl, metal alkoxide and mixtures of these to catalyze or initiate polymerization of the desired monomer, as in (II), in the range of 0.001 to 5% by weight of the total reaction mixture, and (IV) optionally, other additives like a monomeric or polymeric plasticizer, other than water, each composed of polar groups, such as OH, —NH, and —NH$_2$ that has a boiling point appreciably greater than the processing temperature, in the range of 0.1 to 30% by weight of the total reaction mixture.

The polysaccharides applicable to the present invention, as outlined in (I) above, have hydroxyl groups that serve as sites for grafting of chains of aliphatic polyesters. It is preferred that the dispersed phase, reactive substrate containing suitable functional groups used in this invention be starch-like polysaccharides. The sources of such starches are rice, corn, potato, tapioca, wheat, oats and many others. Physically and chemically modified starches and high amylose starches, modified or not, hydrophobic or not are also included in the scope of the invention. Such materials include amylopectin, amylose, starch and amylose esters having a degree of substitution in the range of 0.5 to 3, hydroxyalkyl starches with a degree of substitution in the range of 0.1 to 3 and the like, all being in their native form or one that is granular, plasticized, destructurized, solvated, physically or chemically modified in any other way, and mixtures of these so long as hydroxyl or amine groups are available for reaction with the cyclic ester monomer.

Polysaccharides especially starches, modified by reaction with metal alkyl polymerization initiators, especially alkyl aluminum, as outlined in our earlier application (Narayan et al., U.S. patent application Ser. No. 08/400,979) to form "activated starch" are also within the scope of the invention. Such a component is added downstream (away from the feed throat) or pre-mixed with the feed to result in a graft polymer of polysaccharide and aliphatic polyester.

It is further preferred that the starches used be derived from corn, wheat, and potato, in a form that is granular, plasticized, destructurized, solvated, physically or chemically modified in any other way, or mixtures of these. The amount of such starches in the reactant mixture preferably lies in the range of 0 to 95% by weight of the total amount of starch and monomer in the reactant mixture.

The choice of the type and amount of the polymerizable cyclic ester monomer, as outlined in (II) above, is based on biodegradability, compatibility considerations, molecular weight, melt viscosity, mechanical properties, processability, hydrophobicity, and cost. The more important amongst these are believed to be biodegradability, hydrophobicity, melt viscosity, mechanical properties and compatibility considerations.

In accordance with the invention, the cyclic ester monomers of choice are non-substituted lactones like $\epsilon$-caprolactone, $\delta$-valerolactone, $\beta$-propiolactone, substituted lactones like $\beta$-butyrolactone, $\beta$-valerolactone, and the like, lactides, glycolide cyclic anhydrides such as adipic anhydride, and cyclic carbonates. The preferred monomers within the scope of this invention that are to be polymerized are $\epsilon$-caprolactone and lactide isomers. It is further preferred that $\epsilon$-caprolactone, in the range of 5–100% by weight of the total amount of starch and monomer in the reaction mixture, be the monomer that is to be polymerized.

The chosen aliphatic ester monomer that is to be polymerized to form high molecular weight polymer contain less than 100 ppm water and having an acid value less than 0.5 mg KOH/g and preferably less than 0.2 mg KOH/g. The presence of water and free acid in the reactant mixture is especially significant in the synthesis of high molecular weight polycaprolactone polymer by reactive extrusion polymerization since it has a deleterious effect on the kinetics and ultimately leads to lower conversion of monomer to polymer. It has been observed that these impurities interact with the polymerization catalyst or the propagating species and lower the overall rate of polymerization. In cases where the monomer contains greater than 100 ppm water, the desired water content may be achieved by any of the drying techniques known in the art, the preferred method being the use of molecular sieves (physical method) or calcium hydride (chemical method). The extent of free acid in the reactant varies according to the purity of the monomer grades commercially available.

Two classes of catalyst/initiator are preferred to carry out the aforementioned polymerization of the chosen monomer as outlined in (III) above; one being Lewis acid catalysts such as Ti, Zn, and Sn salts and more preferably stannous octoate (stannous 2-ethyl hexanoate) and the second being metal alkoxides like titanium tetrabutoxide, aluminum tri-sec butoxide, and aluminum isopropoxide. Metal alkoxides, as is, and metal alkoxides generated in situ by coupling of metal alkyls with starch hydroxyls or other functional groups discussed above are the preferred polymerization agents. Metal alkoxides are represented as M(OR)$_x$ where M=Al, Ti, Zn, Zr, Sn and the like, and x is 1 to 4. Metal alkyls are represented as M(Alk)$_2$, where Alk=alkyl radical, linear or branched, substituted or not, with 1 to 18 carbon atoms and x is 1 to 4. Dimers, trimers, tetramers, chelates and complexes of metal alkoxides and metal alkyls are also included as organometallic polymerization agents that are within the scope of the invention. Aluminum isopropoxide, aluminum tri-sec butoxide, alkoxide generated in situ by using tri ethyl aluminum or di-isobutyl aluminum hydride, and mixtures thereof are the most preferred initiators for the bulk polymerization of $\epsilon$-caprolactone monomer, within the scope of the invention. It is preferred that the amount of such polymerization initiators/catalysts be at least 0.001% by weight of the reaction mixture.

Optional plasticizers as outlined in (IV) are well known in the art. Typical plasticizers are water, dihydric, trihydric, polyhydric alcohols, and their derivatives. Some examples are ethylene glycol, propylene glycol, glycerol, glycerol esters, erythritol, pentaerythritol, sorbitol, and higher molecular weight plasticizers like poly glycerol and poly glycerol esters. Glycerol esters include glycerol monoacetate, diacetate, and triacetate. For the purpose of this invention, it is preferred that the plasticizers chosen have a boiling point sufficiently higher than the processing temperature in the extruder and be thermally stable. The preferred plasticizers are glycerol, glycerol esters, sorbitol, and mixtures thereof. It is preferred that the amount of the plasticizer be in the range of 1 to 30% by weight of the total reactant mixture.

A schematic drawing of an extruder 10 is shown in FIG. 1. The appropriate reaction mixture (Components I, II, and IV) was pre-mixed in vessel 11 at room temperature and in a nitrogen atmosphere and were introduced into the feed throat 12 of a twin-screw 13A extruder 13 (such as ZSK-30 Werner Pfleiderer, Ramsey, N.J.) at a feed rate of 2–20 lb/hr, extruder screw speed 20–300 rpm, preferably 30–150 rpm and an extrusion temperature of at least 80° C., wherein the extruder 13 was also under nitrogen gas blanketing. The reaction mixture was introduced by means of a pump 14 at the desired feed rate. The appropriate polymerization agent (Component III) was separately metered by a pump 15. The two components were introduced as separate streams in the feed throat. Alternatively, the two feed streams may be mixed in a pre-mixer, heated or not, and then be introduced in the feed throat 12. The optional secondary components such as starches are added downstream (away from the feed throat 12) or admixed with the feed to form an aliphatic polyester intermediate wherein the starch may be grafted to the polyester. Polysaccharides, especially starches, modified by reaction with metal alkyl polymerization initiators, especially alkyl aluminum, as outlined in our earlier application (Narayan et al., U.S. patent application Ser. No. 08/400,979) to form "activated starch" are examples of such secondary components. The extruder 13 was vented downstream at vent 16 to remove volatiles, especially unconverted monomer by a vacuum pump. The removed monomer may be recycled back in the process loop. A die 17 was used to extrude the polymer product 100. Downstream from the feed throat 12, a second feed section 18 may be provided for optional additives like plasticizers, fillers, reaction terminators and other additives. The additives chosen may react with unconverted monomer to form graft polymers and other such products. An example of such an additive would be starch or other polymers that have been treated as discussed in the earlier application (Narayan et al., U.S. patent application Ser. No. 08/400,979) so as to be able to initiate the polymerization of unconverted monomer, forming a graft polymer. At the end of the polymerization zone, it may be favorable to add a stoichiometric amount of polymerization terminator like acetic acid, acetic anhydride or other components that function to terminate the propagating species and thereby prevent depolymerization at higher temperatures or during re-processing. Other blend polymers that can be optionally added are preferably added downstream in a mixing zone designed for polymer-polymer mixing.

The extruder 13 conditions were set to control the polymerization temperature to be at least 80° C. with residence times up to 12 minutes. The polymerization and mixing can be conducted in two separate extruders/reactors/mixers, with the appropriate residence time and temperature conditions in each. For instance, a pre-reactor/extruder may be used to derive a low molecular weight polycaprolactone polymer which is then fed to the extruder along with the addition of more monomer to complete the conversion to a high molecular weight polymer. The choice of appropriate screw configurations in the extruder is important in ensuring complete conversion of monomer, high molecular weight, favorable kinetics, and control over the resulting molecular weight. For example, it has been shown that the use of high shear zones in the extruder is beneficial in molecular weight control in the case of nylon polymerization. However, that is not the case for ε-caprolactone polymerization for which a high shear process results in heat generation leading to side reactions that give a loss in molecular weight.

Figure 2:
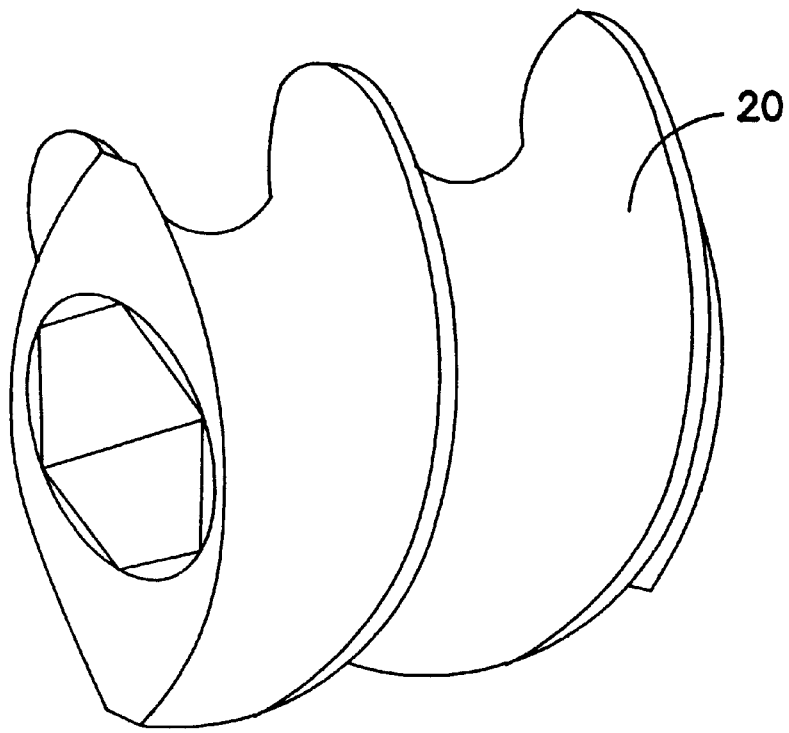
Figure 3:
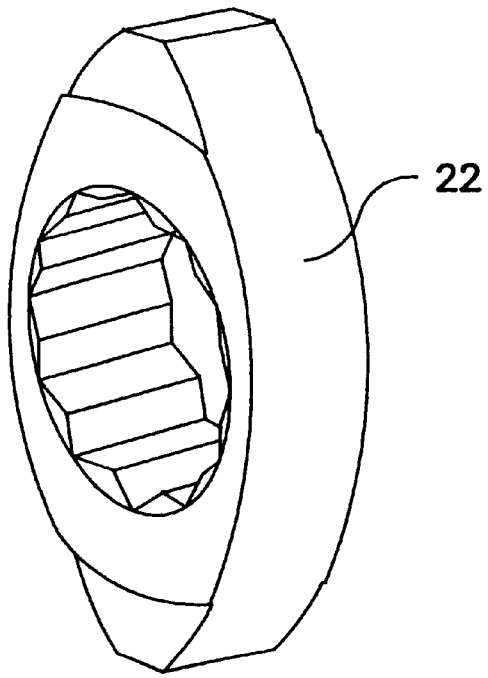
Figure 4:
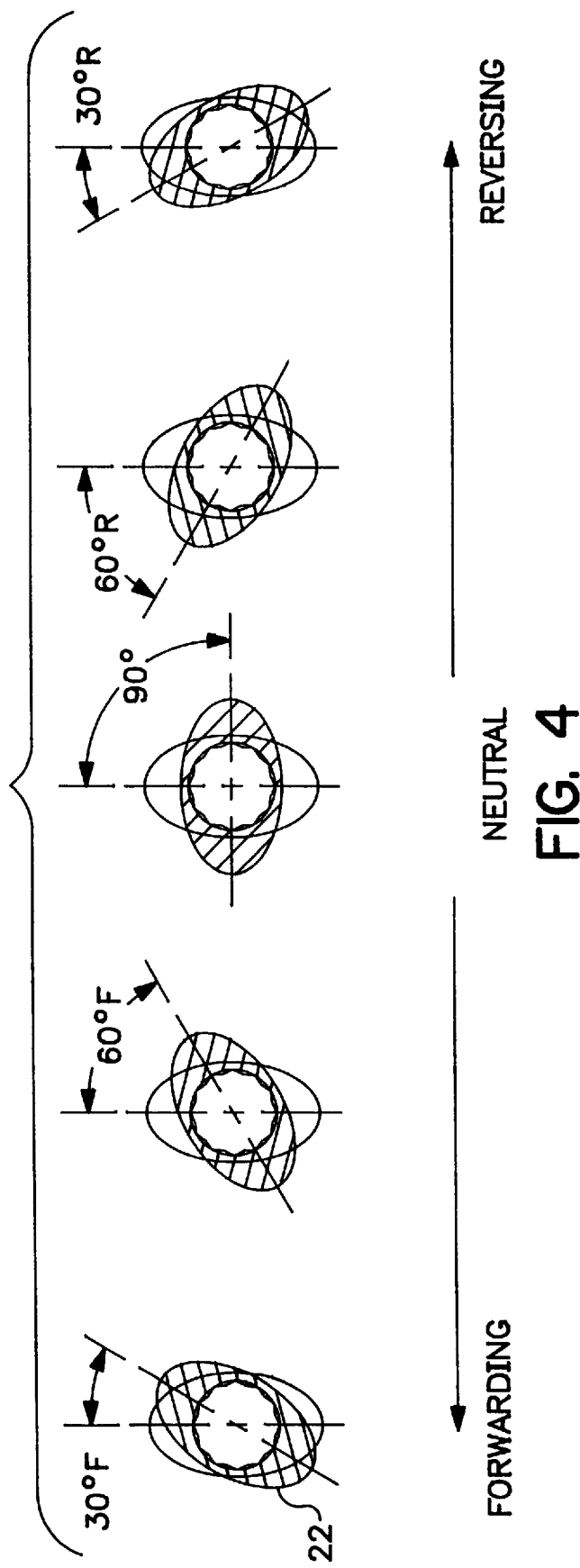
FIG. 4 is a front view of various screws 13A positions which can be provided by the screw elements 20.
Figure 5:
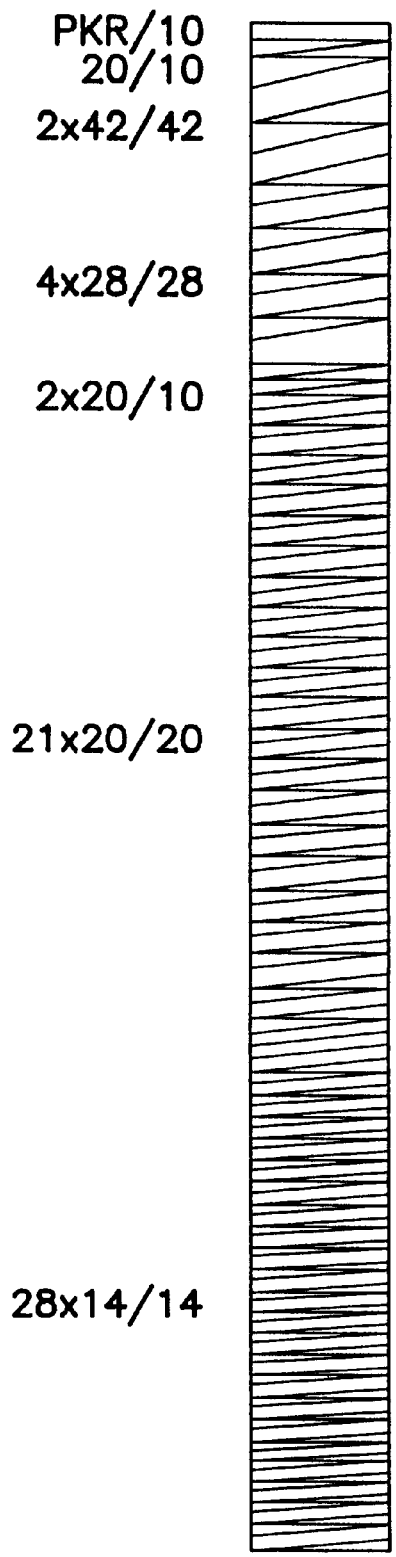
FIGS. 5 and 6 are schematic drawings showing preferred screw 13A configurations.
Figure 6:
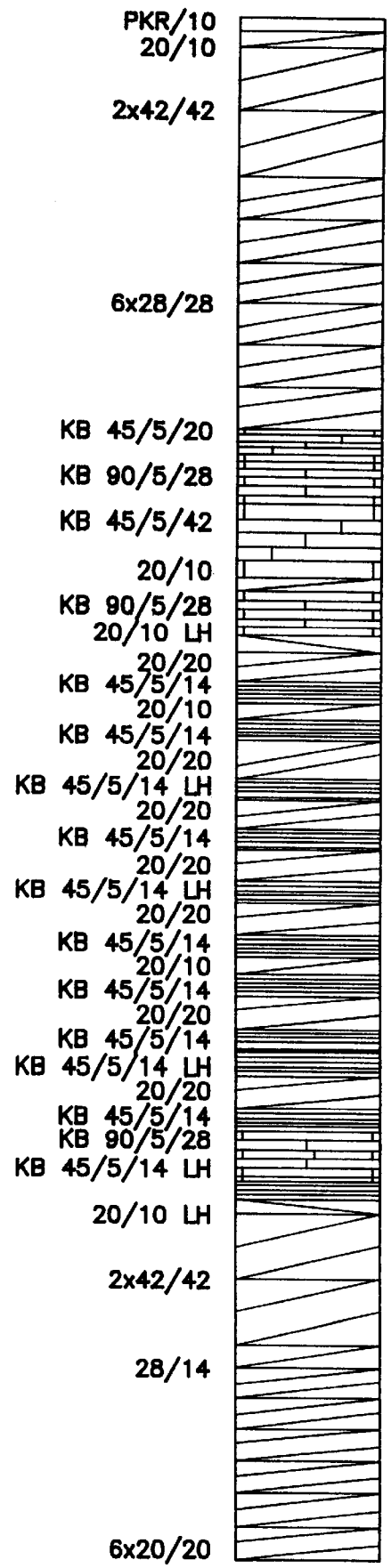

A number of screw 13A configurations were employed in the reactive extrusion process. Twin screw 13A extruder configurations are primarily composed of screw elements 20 and kneading blocks 22. The primary function of screw elements 20 is to provide conveying of the melt. Screw elements 20 can be single flighted or double flighted and are represented by a set of two numbers as X/Y where X is the pitch of the screw elements 20 in millimeters, mm and Y is the axial length of the element 20, also in mm. Additionally, they may also be reverse flighted and these are represented as X/Y LH. Kneading blocks 22 primarily serve to provide high shear mixing and show lesser conveying capability than screw elements 20. These are represented as KB X/Y/Z where X is an angle that represents the degree of stagger of the kneading block 20 elements, Y is the number of kneading block 20 elements and Z is the pitch in millimeters, mm. Additionally, they may also be reverse staggered and these are represented as KB X/Y/Z LH. Two particular screw element 20 and kneading block 22 configurations that were evaluated are shown in FIGS. 5 and 6. FIG. 5 (Example 3) shows a screw 13 configuration that is entirely made up of conveying screw elements 20 (FIG. 2) which ensures near-plug flow conditions with minimal back-mixing. FIG. 6 (Example 4) shows a screw 13A configuration that has separate mixing zones which generate high shear in the reactor by use of kneading blocks 22 and screw elements 20. In the latter case poor control over molecular weight possibly can be attributed to the sensitivity of the composition to shear and thermal-induced back-biting reactions. The low shear-process in the case of screw 21 configuration of FIG. 2 ensures a high molecular weight product obtainable at high throughput and in high yield.

The process scheme outlined above is used to derive polymer compositions, especially biodegradable compositions like pellets, films, sheets, moldings, foams, and fibers starting from a monomer, preferably a lactone monomer and more preferably ε-caprolactone monomer. Reactive extruded polymer 100 (FIG. 1) as exited from the die is a biodegradable composition that is within the scope of this invention. Compositions that are also within the scope of this invention include blends of the reactive extruded poly(ε-caprolactone) polymer 100 (FIG. 1) with other polymers, plasticizers and fillers.

The following equation represents the evolution of the branched poly(ε-caprolactone) structure with up to 4 arms (depending upon the metal) or more depending on the polymerization agent, as derived by bulk polymerization of ε-caprolactone monomer via a

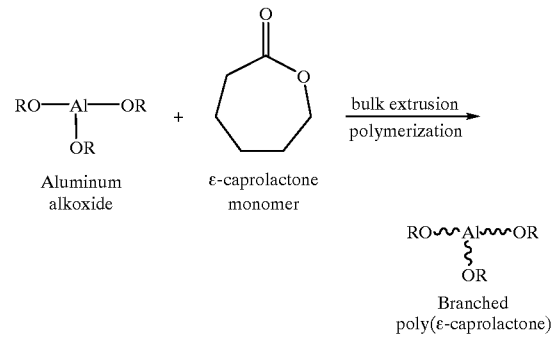

co-ordination insertion mechanism in an extruder. On account of the branched nature of the polymer high molecular weight compositions with high melt viscosities and good melt processing characteristics were easily synthesized.

The poly(ε-caprolactone) polymer product 100 (FIG. 1), is a unique branch polymer intermediate as compared to commercially available linear polycaprolactone polymer. This is similar to the case of low-density polyethylene (more branched) versus high-density polyethylene (more linear). Every molecule of the aluminum alkoxide polymerization agent used can potentially generate a maximum of 3 arms of the polymer chain coupled to the Al atom, resulting in a branched poly(ε-caprolactone). Mechanical properties of blown film compositions made using these polycaprolactone intermediates (Example 10) show different elongation, tear and dart impact strengths as compared to a similar composition made with commercial linear polycaprolactone polymer (Example 11).

Films and other products, especially biodegradable films and bags of this poly(ε-caprolactone) branch polymer composition can be produced by direct extrusion from the reaction extruder 13 starting from ε-caprolactone monomer and other suitable reactants.

Further, blends of the reactive extruded poly(ε-caprolactone) polymer intermediate 100 (FIG. 1), preferably branched, with other polymers, plasticizers and fillers are also included within the scope of this invention. Such a blend composition using the aforementioned aliphatic polyester obtained by ring-opening polymerization comprises one or more of the following:

(A) optionally, aliphatic polyester-grafted starch, synthesized as outlined in earlier patent application (Narayan et al., U.S. application Ser. No. 08/400,979) in the amount of 0.1 to 90% by weight of the composition, wherein the starch phase may be in a form that is granular, plasticized, destructurized, solvated, physically or chemically modified in any other way, or as a mixture of these, wherein the aliphatic polyester includes polymers and copolymers of lactones, lactides, and glycolide, substituted or not, and mixtures of the above.

(B) optionally, other polymers, including those based on lactones, lactides, and glycolide, substituted or not, polyorthoesters, polymers and copolymers of hydroxybutyrate and hydroxyvalerate, poly(alkylene d-tartrate), vinyl polymers like poly (vinyl alcohol), poly(vinyl acetate), ethylene vinyl alcohol copolymer, ethylene-vinyl acetate copolymer, polyanhyrides like polyadipic anhydride, polycarbonates, proteins, polysaccharides like starches and cellulosics including cellulose, cellulose acetate, cellulose butyrate, and cellulose propionate, lignocellulose, starch, starch esters and amylose esters, each of these being in a form that is granular, plasticized, destructurized, solvated or physically or chemically modified in any other way, copolyesteramides, preferably based on caprolactone and caprolactam, polyolefins, polyurethanes, and mixtures thereof, each of these being hydrophobic or not, modified or not as in branched, cross-linked, copolymerized, functionalized, surface-modified, physically or chemically modified in other similar ways. The branching or cross-linking is conducted separately or in situ by a peroxide initiation; copolymers includes copolymers of lactones, lactides, and glycolide, substituted or not with each other and graft copolymers of lactones, lactides, and glycolide, substituted or not with various functional monomers like maleic anhydride, stearic anhydride, ethylene oxide, aliphatic and aromatic isocyanates, and acrylic acid, wherein the grafting of these functional monomers is conducted separately or in situ, preferably by peroxide initiated grafting in an extruder, and wherein the amount of grafted monomer is at least 0.1% with respect to the main polymer; funtionalization of lactones, lactides, and glycolide, substituted or not related to end-capping these polymers with suitable functional groups like unsaturated groups, isocyanate groups and the like.

Of these, the preferred polymers are those that are biodegradable, such as those based on proteins, polysaccharides as described above, polymers of lactones, lactides, and glycolide, substituted or not, aliphatic polyesters, polyamides and polyestaramides, and mixture thereof, each of these being hydrophobic or not, modified or not as in branched, cross-linked, copolymerized, functionalized, surface-modified, physically or chemically modified in other similar ways. The preferred amount of these polymers in the final composition is in the range of 10 to 90% by weight, and (C) optionally, additives in the range of 0.1 to 30% by weight based on the final composition like a monomeric or polymeric plasticizer other than water, to plasticize any component in the mixture, colorants, and other additives like slip agents. Plasticizers for the non-polysaccharide components like poly (vinyl alcohol), polylactones, polylactides, and cellulosics described above are also included within the scope of the invention. Such plasticizers include phthalic acid derivatives like diethyl phthalate, dimethyl phthalate, and dioctyl phthalate, phosphoric acid derivatives like triethyl phosphate, tributyl phosphate, and trioctyl phosphate, glycerol, and glycerol esters, and sulfonic acid derivatives.

(D) optionally, peroxides to cross-link the polyester and improve melt strength, in the amount of 0.1 to 2 part of peroxide per hundred parts of the polyester, and (E) optionally, fillers and reinforcements employed in plastics, in an amount up to 40% by weight of the composition.

The following non-limiting procedures and examples are used to further describe the invention and illustrate some of the highlights of the invention.

The molecular weight of the polycaprolactone polymer was obtained by Size Exclusion Chromatography (SEC) relative to polystyrene standards in tetrahydrofuran solvent at 25° C., using a refractive index detector.

EXAMPLE 1

Reactive Extrusion Process for Polymerization of ε-Caprolactone Monomer using Aluminum Tri-sec Butoxide (Aluminum Alkoxide)

The polymerization of ε-caprolactone monomer using aluminum tri-sec butoxide (aluminum alkoxide) by a coordination insertion mechanism via reactive extrusion is described. ε-Caprolactone monomer was dried over a 3 Angstrom molecular sieves prior to being introduced in the extruder 13 as shown in FIG. 1. A 1.0 M solution of aluminum tri-sec butoxide in dry toluene was prepared. A Werner Pfleiderer (Ramsey, N.J., USA) twin-screw extruder, ZSK-30 (with the screw 13A configuration of FIG. 5) was used for the polymerization process and was set to a barrel temperature of 180° C. Monomer and catalyst solutions were introduced as separate streams in the feed throat 12 of the extruder 10 using peristaltic pumps. The monomer feed rate was 15.2 lb/h. The polymerization agent feed rate was 0.284 mL/min. The extruder screw speed used as 90 rpm resulting in a mean residence time greater than 3 min. The extrudate was cooled and pelletized. Complete conversion of monomer was achieved and high polymer with a number average molecular weight, Mn, of 107,000 (with respect to polystyrene) was obtained.

EXAMPLE 2

Reactive Extrusion Process for Polymerization of ε-Caprolactone Monomer with Low Acid Value using Aluminum Tri-sec Butoxide (Aluminum Alkoxide)

The polymerization of ε-caprolactone monomer, having an acid value of 0.08 mg KOH/g, using aluminum tri-sec butoxide (aluminum alkoxide) is described. Monomer drying and extrusion conditions were in the manner of Example 1. The extruder screw speed used was 150 rpm, resulting in a mean residence time of less than 1 minute. Complete conversion of monomer was achieved and high polymer with a number average molecular weight, Mn, of 133,000 (with respect to polystyrene) was obtained.

Comparison of Examples 1 and 2 demonstrates the benefit of using ε-caprolactone monomer with a low acid value in achieving complete conversion of monomer to high molecular weight polymer in a shorter residence time.

EXAMPLE 3

Reactive Extrusion for Polymerization of ε-Caprolactone Monomer using Aluminum Tri-sec Butoxide (Aluminum Alkoxide) in the presence of Starch.

The polymerization of ε-caprolactone was conducted in the presence of other components bearing hydroxyl functionalities, specifically starches, by a process similar to that outlined in Example 1. The secondary component was included in the reactant feed mixture. ε-Caprolactone monomer was dried over 3 Angstrom molecular sieves prior to being introduced in the extruder 13. Starch was preferably used as the secondary component and was dried in a forced convection or vacuum oven at 120° C. for 24 hours. A 1.26 M solution of aluminum tri-sec butoxide in dry toluene was prepared. A Werner Pfleiderer (Ramsey, N.J., USA) twin-screw extruder, ZSK-30 (screw 13A configuration FIG. 5) was used for the polymerization process and was set to a barrel temperature of 110° C. The monomer solution was pre-mixed with the starch component as a slurry in which the amount of starch was 5% by weight of the total weight of starch and monomer in the solution. Solutions of monomer pre-mixed with starch and catalyst were introduced in the feed throat of the extruder 10 using peristaltic pump 14. The monomer feed rate used was 20 lb/h. The polymerization agent feed rate used was 2 mL/min. The extruder screw 13A speed was 90 rpm. The extrudate was cooled and pelletized. Complete conversion of monomer was achieved and high polymer with a number average molecular weight greater than 25,000 (with respect to polystyrene) was obtained.

EXAMPLE 4

Effect of a Particular Screw Configuration on the Polymerization of ε-Caprolactone A Werner Pfleiderer (Ramsey, N.J.) twin screw 13A extruder 10, ZSK-30 (screw 13A configuration of FIG. 5) was used for the bulk polymerization of ε-caprolactone, in the manner of Example 1. The extruder screw configuration used was as shown in FIG. 5. A 1.0 M solution of aluminum tri-sec butoxide in toluene was used as the catalyst. The monomer to catalyst feed ratio was adjusted to yield a polymer with a theoretical molecular weight of about 400,000. The extrusion conditions were similar to those in Example 1.

EXAMPLE 5

Effect of Particular Screw Configuration on the Polymerization of ε-Caprolactone A Werner Pfleiderer (Ramsey, N.J.) twin screw 13A extruder 10, ZSK-30 was used for the bulk polymerization of ε-caprolactone, in the presence of a starch substrate in the manner of Example 3. The extruder screw 13A configuration used is as shown in FIG. 6. A 1.26 M solution of aluminum tri-sec butoxide in toluene was used as the catalyst. The monomer to catalyst feed ratio was adjusted to yield a polymer with a theoretical molecular weight of about 60,000. The extrusion conditions were those as in Example 3.

EXAMPLE 6

Biodegradable Blend Compositions using Reactive Extrusion Polymerized Polylactone.

A biodegradable blend composition using the poly(ε-caprolactone) of Example 1 in admixture with starch is described. 70 parts of poly(ε-caprolactone) polymer composition by weight was mixed with 30 parts plasticized starch component by weight and extruded at 200 rpm at 150° C. in a Werner Pfleiderer (Ramsey, N.J.) twin screw extruder (with a screw 13A configuration as shown in FIG. 5). The extrudate was cooled and pelletized.

EXAMPLE 7

Flat-die Film Extrusion

The composition of Example 1 was extruded into films using a Killion single screw extruder at 160° C. and 20 rpm. The chill roll was maintained at about 22° C. to yield transparent films.

EXAMPLE 8

Blown-film Extrusion

The composition of Example 6 was blown into films of 1.0 and 1.5 mils thickness in a single-screw extruder at 143° C. and a screw speed of 30 rpm. Representative values of the properties of these films at 72° F. and 40% relative humidity are listed in Table 1.

TABLE 1

| Property | Units | Value | |
|---|---|---|---|
| Nominal thickness | mils | 1.0 | |
| Tensile stress at yield | psi | MD | 2404 |
| | | CMD | 2098 |
| Elongation at break | % | MD | 257 |
| | | CMD | 75 |
| Tear | grams | MD | 81.5 |
| | | CMD | 208.9 |
| Dart drop | grams | 136.5 | |

EXAMPLE 9

Biodegradable Blend Compositions using Linear Polycaprolactone

A biodegradable blend composition using the poly(ε-caprolactone) TONE 787 from Union Carbide (Bound Brook, N.J.) in admixture with starch is described. 70 parts of TONE 787 poly(ε-caprolactone) polymer by weight was mixed with 30 parts plasticized starch component by weight and extruded at 200 rpm at 150° C. in a Werner Pfleiderer (Ramsey, N.J.) twin screw extruder (with the screw 13A configuration is shown in FIG. 5). The extrudate was cooled and pelletized. The composition was blown into films of 1.0 and 0.5 mils thickness in a single-screw extruder at 143° C. and a screw speed of 30 rpm. Representative values of the properties of these films at 72° F. and 40% relative humidity are listed in Table 2.

TABLE 2

| Property | Units | | Value |
|---|---|---|---|
| Nominal thickness | mils | | 1.0 |
| Tensile stress at yield | psi | MD | 1394 |
| | | CMD | 1309 |
| Elongation at break | % | MD | 629 |
| | | CMD | 460 |
| Tear | grams | MD | 56.6 |
| | | CMD | 86.3 |
| Dart drop | grams | | 118.5 |

EXAMPLE 10

Direct Extrusion to form Films of Branched Poly(ε-Caprolactone

A direct extrusion process to form extruded films of the polydisperse, poly(ε-caprolactone) branch polyester intermediate is described. The extruder and process arrangement similar to that described in Example 2 is used. The exiting product is fed to a gear pump or a single screw extruder attached downstream, in order to generate sufficient pressure and assure melt stability for good film extrusion (blown or flat-die). Suitable downstream equipment is used to form the bubble (in the case of blown-film) or the flat web (in the case of flat-die film). The resultant product is a novel film comprised of branched poly(ε-caprolactone) with the omission of the intermediate steps of strand-forming, cooling, pelletizing, drying and re-processing.

It is intended that the foregoing description be only illustrative of the present invention and that the present invention be limited only by the hereinafter appended claims.

We claim:

1. A branched aliphatic polyester polymer intermediate with 3 or 4 branches from a metal alkoxide polymerization agent having a number average molecular weight, $M_n$ greater than 100,000 wherein the aliphatic polyester component is derived from a cyclic aliphatic ester monomer containing 4 to 24 carbon atoms.

2. The polymer intermediate of claim 1 that is anhydrous and has the following structural formula:

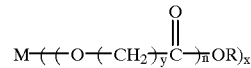

wherein M is a metal species selected from the group consisting of tin, titanium, lithium, aluminum, zinc, zirconium, and samarium and mixtures thereof; y is between 3 and 23; x is an integer between 3 and 4 representing the number of arms attached to M; n is a number related to a degree of polymerization, which is up to 2,000 and which produces the average molecular weight (Mn) greater than 100,000 and which may be different for each arm, x; and R is an alkyl radical containing 1 to 6 carbon atoms.

3. The polymer intermediate of claim 2 wherein M is aluminum.

4. The polymer intermediate of any one of claims 1, 2 or 3 wherein the amount of the aliphatic ester component is in the range of 60 to almost 100% by weight of the aliphatic ester component and organometallic polymerization agent in the reactant mixture, the amount of the organometallic polymerization agent is 0.0001 to 2% by weight of the aliphatic ester component and organometallic polymerization agent in the reactant mixture.

5. The polymer intermediate of claim 4 wherein the aliphatic ester component is selected from the group consisting of ε-caprolactone monomer and oligomer thereof, and the organometallic polymerization agent is selected from the group consisting of a metal alkoxide and metal alkyl and mixtures thereof.

6. The polymer intermediate of claim 5 wherein the metal alkoxide is aluminum tri-sec butoxide.

* * * * *